United States Patent [19]

Angel

[11] Patent Number: 5,265,317
[45] Date of Patent: Nov. 30, 1993

[54] GEOMETRY STATION

[75] Inventor: Jeffrey R. Angel, Oxford, Mich.

[73] Assignee: Progressive Tool & Industries Co., Southfield, Mich.

[21] Appl. No.: 811,180

[22] Filed: Dec. 19, 1991

[51] Int. Cl.⁵ .......................... B25B 1/20; B23P 11/00
[52] U.S. Cl. ...................................... 29/429; 29/464; 29/559; 228/212; 414/786; 901/6
[58] Field of Search ................ 29/464, 559, 429, 430, 29/822, 281.4, 281.5; 228/49.1, 212; 269/17, 309; 414/786; 901/6, 7, 40, 42

[56] References Cited

U.S. PATENT DOCUMENTS

| | | | |
|---|---|---|---|
| 2,329,938 | 9/1943 | Ortiz | 228/212 X |
| 4,196,840 | 4/1980 | McClure | 228/212 |
| 4,605,569 | 8/1986 | Shimada et al. | |
| 4,627,785 | 12/1986 | Monforte | |
| 4,853,603 | 8/1989 | Onoue et al. | |
| 4,894,903 | 1/1990 | Woods | 29/559 X |
| 5,141,093 | 8/1992 | Alexander | 29/822 X |

Primary Examiner—Joseph M. Gorski
Attorney, Agent, or Firm—Remy J. VanOphem

[57] ABSTRACT

The method and apparatus for the manufacture of product subassemblies by computer programmed robots is an end effector fixture assembly, or geometry station wherein at least two individual elements of the particular subassembly are dimensionally positioned relative to one another between a lower base fixture and an upper fixture of the end effector fixture assembly to establish a net location therebetween. The robot manipulates the end effector fixture assembly and transports the two individual elements located therein to a work performing station located within a defined region of the robot to perform work on the subassembly.

2 Claims, 4 Drawing Sheets

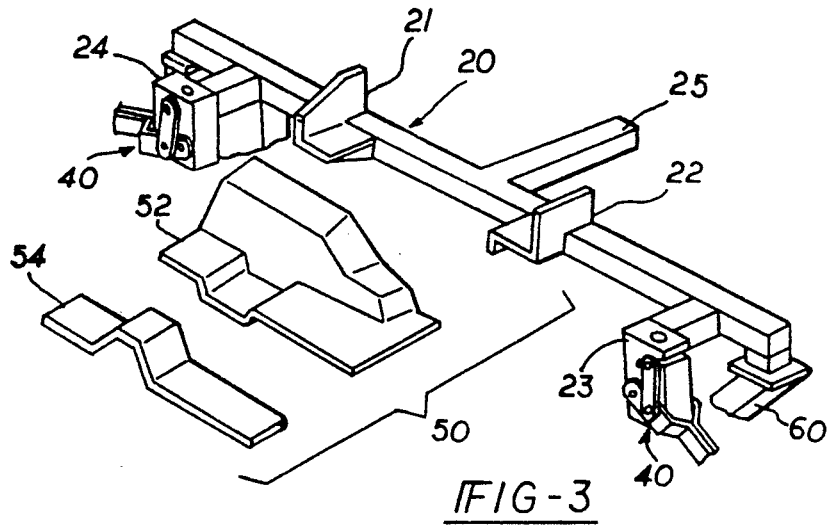

- LOAD PART 52 ONTO LOWER CARRIER  FIG-3
- LOAD PART 54 ONTO PART 52 AND POSITION  FIG-3
- MOVE UPPER CARRIER ARM INTO POSITION  FIG-1
  - LOCK UPPER CARRIER TO LOWER CARRIER
- COMMAND ROBOT ARM TO LIFT AND TRANSPORT ENTIRE CLAMPING AND NESTING FIXTURE TO WORK STATION  FIG-2
- PERFORM WORK OPERATION (WELDING)  FIG-2
- RETURN CLAMPING AND NESTING FIXTURE TO HOME POSITION  FIG-1
- UNLOCK UPPER AND LOWER CARRIER  FIG-1
- RELEASE PART CLAMPING MEANS  FIG-1
- ACTIVATE SECONDARY ATTACHING MEANS TO ENGAGE FINISHED PARTS TO UPPER CARRIER  FIG-1
- DELIVER FINISHED PARTS TO CONVEYOR VIA UPPER CARRIER
- LOAD NEW PARTS TO LOWER CARRIER  FIG-3

GEOMETRY STATION

BACKGROUND OF THE INVENTION

1. Field of the Invention

The present invention relates to an apparatus and method for the manufacture of subassemblies, particularly as used in the construction of automobiles and the like. Specifically, the invention is an apparatus and method which establishes a predetermined geometric relationship between at least two parts in a geometry station in the form of an end effector attached to the wrist head of a robot. The robot may be programmed to convey the geometry station to any one of a number of work performing devices located within a defined work region surrounding the robot to perform work on the at least two parts securely maintained in the geometry station.

2. Description of the Prior Art

In the construction of products such as automobiles, many subassemblies are first manufactured in off-line operations to be later assembled to form the final end product which travels along a production line. The subassemblies, themselves, generally include a multiplicity of elements or parts formed together in a given dimensional relationship, one to the other, and interconnected by various techniques such as welding, adhesives, mechanical fasteners and the like. For the purpose of obtaining a high quality end product, it is important that each subassembly conform to given parameters or specifications and that the dimensional stability of the subassembly be repeated from one subassembly to the other thereby assuring that each of the subassemblies when joined together form a quality final product fit together properly.

The modern production line has long recognized the advantages of assembling a complex product, such as an automobile, by the marriage of dimensionally conforming subassemblies. Many of the subassemblies are manufactured by the use of fixtures or jigs. Such fixtures or jigs are generally stationary or may move along a production line where computer controlled robots perform work operations upon the particular workpiece held within the fixture or jig. In this type of environment the robotic end effector must necessarily incorporate one or more tools to perform the desired work operations plus provide or otherwise accommodate the necessary power, energy requirements, and working material supply, to operate the end effector tools. Thus the end effector generally becomes very heavy and relatively complex thereby complicating the function, operation, and construction of the particular robot. Also, since some of the robots must travel some distance to have access to the parts clamped in the fixture or jig securely fixed on the production line, it is necessary to make appropriate provisions for the routing of hydraulic hoses, power supply lines, air supply lines, and the like. All of which lead to complication of the activities associated with production line operations due to the crowded workspace in which these functions are to be performed. To alleviate some of these problems some of the robot functions are combined through the use of exchangeable multi-function end effector tools as taught by U.S. Pat. No. 4,627,785. Further, efforts have been made towards increasing the efficiency of the operation of the robot by utilizing input taken from the robot's position to calculate a feedback as to the path the robot should be programmed for as is taught by U.S. Pat. No. 4,853,603.

Although it is not unknown to use computer programmable robots to position a given workpiece relative to a stationary tool, for application of work operations upon the workpiece as described in U.S. Pat. No. 4,853,603 entitled "Control of an Industrial Robot", or U.S. Pat. No. 4,605,569 entitled "Method and Apparatus for Panel Wiping Operation" it is unknown to provide a computer controlled robot with an end effector fixture, jig, or geometry station wherein the end effector serves to set the geometry of the subassembly elements, lock or hold them firmly in place relative to one another and present the geometrically oriented elements as a geometry station to one or more stationary work performing stations or tools to have desired work performed upon the geometrically oriented elements.

SUMMARY OF THE PRESENT INVENTION

By the present invention an improved fixture in the form of an end effector fixture assembly of a computer programmed robot is taught whereby the end effector fixture assembly provides the individual parts in their desired geometric relationship thereby forming a geometry station, then secures the individual elements in place within the end effector fixture assembly and by the computer programmed robot conveys the end effector fixture assembly to one or more work stations located within a defined region surrounding the robot for performing desired work operations to the secured individual parts such as weldings, drillings, adhesive applications, and the like.

The method and apparatus for the manufacture of product subassemblies by computer programmed robots is an end effector fixture assembly, or geometry station wherein at least two individual elements of the particular subassembly are dimensionally positioned relative to one another by the use of a lower base fixture of the end effector fixture assembly. The lower base fixture of the end effector fixture assembly is preferably positioned upon a stationary stand or supporting structure which provides a temporary work station to accommodate the positioning of loading the lower base fixture to the upper fixture with the subassembly elements secured therebetween to establish an accurately defined geometric relationship between the robot end effector fixture assembly and the subassembly elements. In other words, the subassembly elements are geometrically and accurately positioned upon and relative to the lower base fixture of the end effector fixture assembly manually or by means of another computer controlled robot employing a workpiece gripper so that work may be accurately performed on the subassembly workpiece.

Upon positioning and orientation of the subassembly elements on the lower base fixture of the end effector fixture assembly, the computer controlled robot having the upper fixture portion of the end effector fixture assembly attached to the wrist head of the computer controlled robot unites the upper fixture portion of the end effector fixture assembly with the lower base fixture portion in a given geometric relationship.

The upper fixture portion and lower base fixture portion of the end effector fixture assembly are mechanically locked together thereby forming a geometry station about the pre-positioned subassembly elements. Devices for mechanically interlocking the upper fixture portion and the lower base fixture portion of the end effector fixture assembly may be attached to either the upper fixture portion or the lower base fixture portion. However, to keep the mass of the end effector fixture assembly to a minimum, the power means or energy source for actuating the mechanical interlocking device is preferably located upon the stationary stand or supporting structure upon which the lower base fixture portion of the end effector fixture assembly rests.

Clamping posts are provided on the upper fixture portion of the end effector fixture assembly such that upon mating of and interlocking the upper fixture portion of the end effector fixture assembly to the lower base fixture portion the individual elements of the subassembly are clamped in place one to the other and in the desired geometric orientation.

Upon uniting the upper fixture portion and the lower base fixture portion of the end effector fixture assembly thereby forming a geometry station having the subassembly elements accurately positioned therein, the computer programmed robot transports the geometry station to any desired or series of desired remote stationary work stations located within a defined work region surrounding the robot for performing work upon the assembled elements of the subassembly.

After all desired work is performed upon the subassembly elements the computer controlled robot returns the composite end effector fixture assembly to locate a top of the stationary stand or supporting structure whereupon the upper fixture portion is unlocked from the lower base fixture portion. Upon separation of the upper fixture portion of the end effector fixture assembly from the lower base fixture portion the newly formed subassembly remains attached to the upper fixture portion by any suitable means such as by means of suction cups or any other suitable holding device, thereby unloading the lower base fixture portion and making it ready for reloading.

By the use of the end effector upper fixture portion the computer controlled robot now may transport the newly formed subassembly to a pallet or work station or conveyor for subsequent operations as required and after depositing the newly formed subassembly returns the upper fixture portion of the end effector fixture assembly to the lower base fixture portion to repeat the operation.

BRIEF DESCRIPTION OF THE DRAWINGS

FIG. 3 is a pictorial view of the lower base fixture portion of the end effector fixture assembly generally showing a typical geometric relationship between the lower base fixture portion and the elements of a two piece subassembly;

FIG. 4 illustrates the typical process steps of a computer programmed robot employing the end effector fixture assembly;

DETAILED DESCRIPTION OF THE PREFERRED EMBODIMENT

To minimize the complexity of the invention, the embodiment depicted herein will be that as presently conceived suitable for the manufacture of a relatively simple subassembly workpiece generally having two elements intended to be spot welded at a remote work station. One skilled in the art, upon reading the disclosure, will immediately recognize the broad advantages and applicability of the invention, as taught herein, for the manufacture of more complex subassemblies, including multiple remote work stations as well as complete assembly lines.

Figure 1:
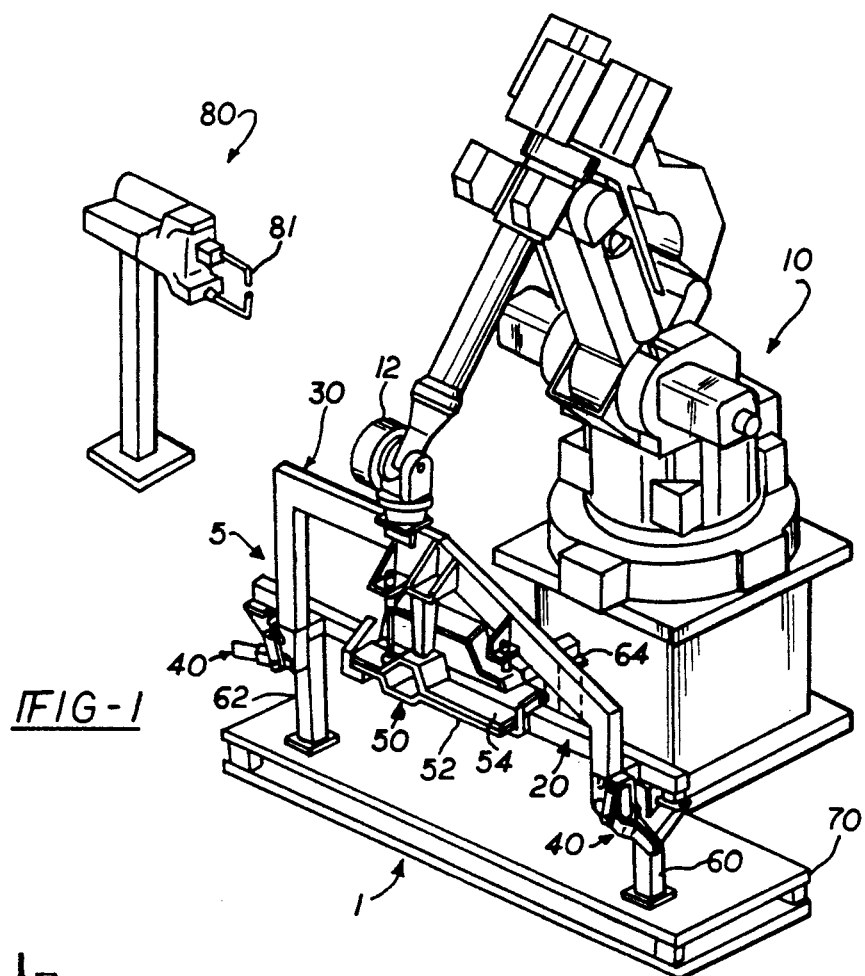
FIG. 1 is a pictorial view of the composite end effector fixture assembly attached to a computer programmed robot and having the elements of a subassembly contained within the geometry fixture.

Referring to FIG. 1, a geometry station 1 embodying the invention is shown wherein an end effector, in the form of a fixture assembly 5, is attached to the wrist head 12 of a programmable robot 10. The geometry station 1 generally includes a lower base fixture member 20 and an upper fixture member 30. Positioned and restrained within the combined upper fixture member and the lower base fixture member is an illustrative subassembly workpiece 50 generally having at least (for illustrative purposes) two elements, a lower element 52 and an upper element 54, as more clearly shown in FIG. 3. For purposes of description of this embodiment, it is the intention to spot weld the two elements of the subassembly workpiece 50 together at a remotely located work station which will be evident from the following description.

The number of elements desired to be assembled together and the number of work stations utilized for purposes of describing this embodiment is not intended to be limiting in that the type of work to be performed to the subassembly workpiece 50 may be of any nature, as will easily be recognized by a person skilled in the art. Accordingly, the programmable robot 10 may be surrounded by a plurality of work stations while the subassembly workpiece 50 may be composed of any number of detailed elements.

Figure 5:
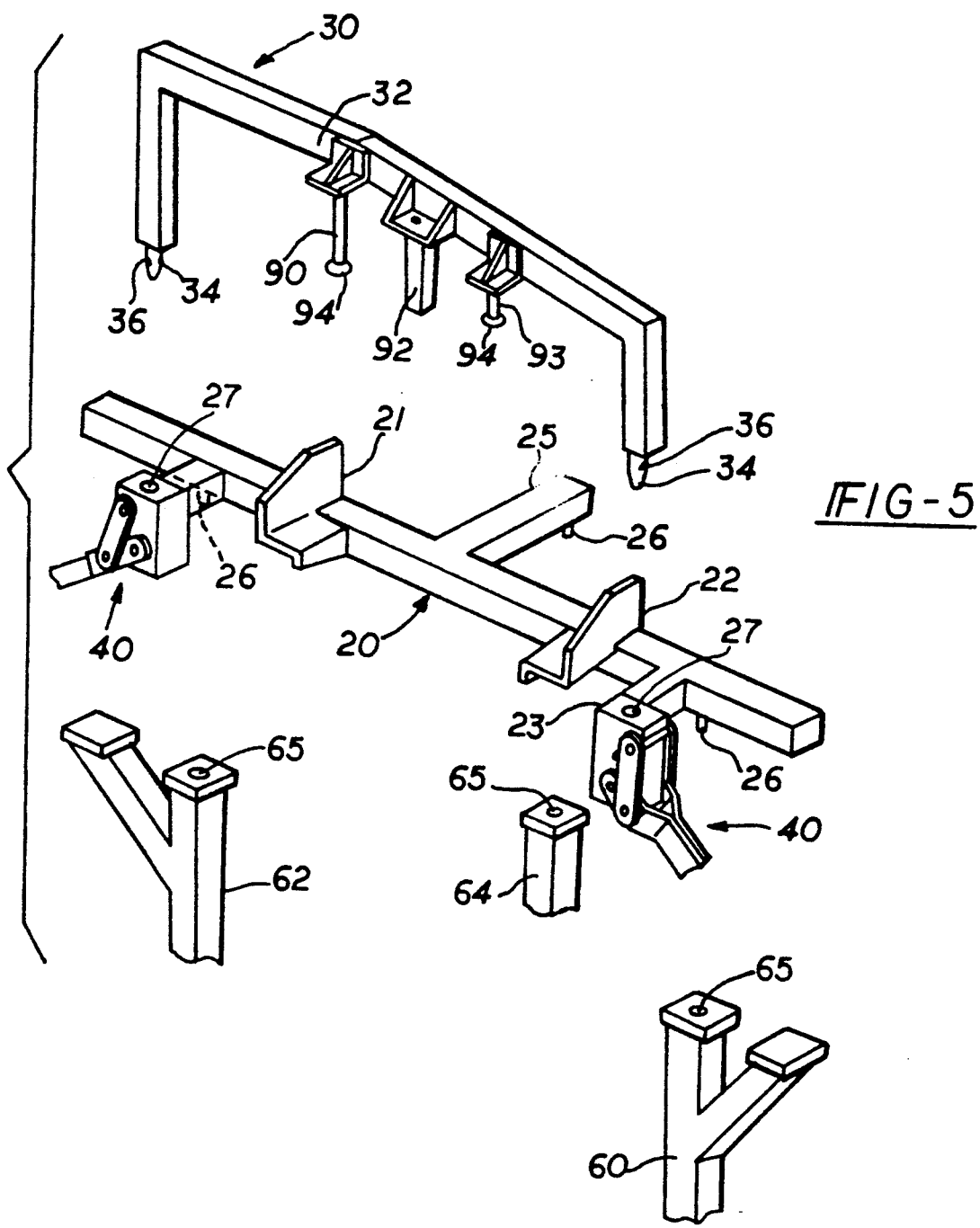
FIG. 5 illustrates an exploded pictorial view of the geometry station showing the general relationship between the end effector upper and lower fixture components and the various clamps and clamping post elements of a typical subassembly and the breakaway illustration of the support structure.

Referring now to FIGS. 3 and 5, the lower base fixture member 20 of the end effector fixture 5 generally has a substantially rigid and sturdy base frame 25. Positioned upon the base frame 25 are workpiece locators 21 and 22. The nature and positioning of the workpiece locators will vary according to the specific workpieces processed through the geometry station 1. For example, the net location of the workpiece elements may be established by the upper fixture member as the upper and lower base fixture members are united. Also positioned upon the base frame are guide and attachment blocks 23 and 24.

The lower base fixture member 20 generally rests upon stationary support stands 60, 62 and 64 when in its "at rest" position for loading of the workpiece subassembly elements. As shown in FIG. 1, the stationary support stands 60, 62 and 64 may be attached to a movable base plate 70 or, alternatively, the stationary support stands may be directly attached to the floor in the vicinity of the robot 10. In either embodiment, the stationary support stands 60, 62 and 64 are located at a predetermined set position with respect to the robot 10, based on the nature of the workpieces to be processed in the geometry station 1. The base frame 25 includes guide pins 26, receivable within alignment holes 65 located in the stationary support stands 60, 62 and 64, respectively, to provide accurate location of the lower base fixture member 20 relative to the stationary support stands 60, 62 and 64. Any other suitable means may be employed for positioning and locating the lower base fixture member 20 upon the stationary support stands 60, 62 and 64.

The upper fixture member 30 is a substantially rigid and sturdy structure, the exact configuration of which will necessarily be dictated by the structure and complexity of the particular subassembly workpiece 50 desired to be accommodated in the geometry station. In general, however, the upper fixture member 30 includes a boundary frame 32 which incorporates locators, in the form of guide and alignment pins 34, for accurately positioning and orienting the upper fixture member 30 with respect to the lower base fixture member 20. The guide and alignment pins 34 are received within alignment pin holes 27 in the guide and attachment blocks 23 and 24 on the lower base fixture member 20.

Figure 6:
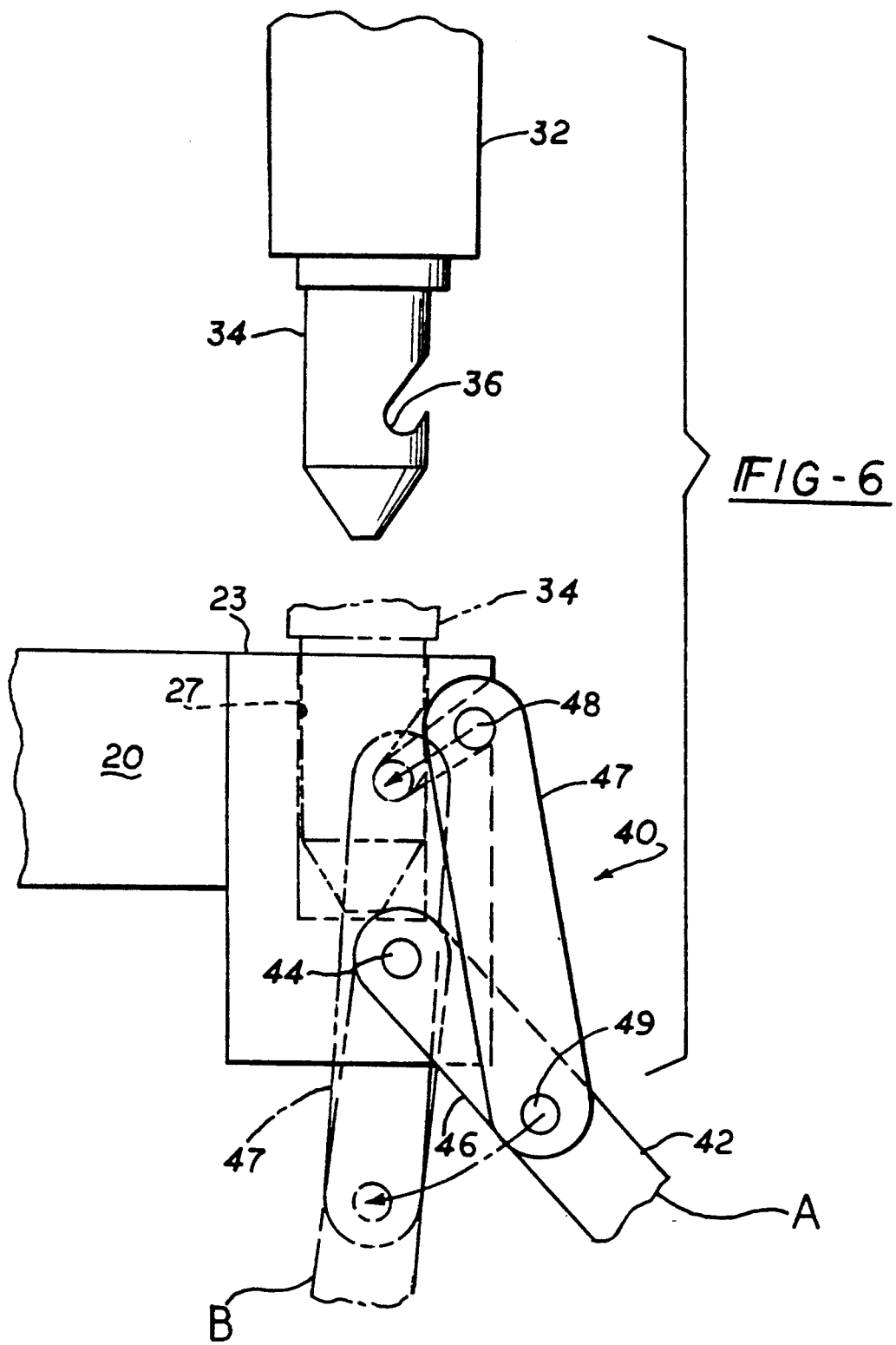
FIG. 6 is a breakaway view illustrating a suitable technique for interlocking the upper fixture portion to the lower fixture portion.

Referring now to FIG. 6, the guide and alignment pins 34 on the boundary frame 32 are provided with a notch 36 for engagement with a toggle latch 40 attached to the guide and attachment blocks 23 and 24 positioned upon the base frame 25 of the lower base fixture member 20 to lock the upper fixture member 30 to the lower base fixture member 20.

Attached to the guide and attachment blocks 23 and 24 on the lower base fixture member 20 are the toggle latches 40 which affirmatively lock the upper fixture member 30 to the lower base fixture member 20 thereby forming the complete end effector fixture assembly 5. As illustrated in FIG. 6, the toggle latch mechanism generally includes a torque link 42 pivotally attached to the guide and attachment block 23 of the lower base fixture member 20 by a pivot 44. The torque link 42 has two levers 46 attached to either side of the guide block 23 at the pivot 44. The torque links 42 may be convergingly merged together as they extend away from the guide block for apparent convenience of operation.

Toggle 47 having a latch pin 48 extending therebetween at the link's terminal end are pivotally attached to the torque links 42 indicated by reference numeral 49.

Referring again to FIGS. 1 and 5, the end effector upper fixture member 30 also includes workpiece clamping devices as necessary to adequately restrain or otherwise hold the subassembly workpiece 50 in a desired geometric relationship. The workpiece clamping devices are preferably attached to the upper fixture member 30 as will become more clear from the discussion which follows. However, a combination of workpiece clamping devices may be provided on both the upper fixture member 30 and the lower base fixture member 20.

Again, for the purpose of illustrating a preferred embodiment of the invention, the following description of the workpiece clamping device is intended to teach the general concept of the geometry station 1, recognizing that actual embodiments of the invention will most likely vary depending on the subassembly workpiece 50 to be processed and upon the particular work to be performed upon the subassembly workpiece 50 at the remote work stations.

The clamping and securing arrangement is accomplished by the mating of the upper fixture member 30 to the lower base fixture member 20 after the lower and upper elements 52 and 54 of the subassembly workpiece 50 have been accurately positioned with respect to each other by either an operator loading both elements on the lower base fixture member 20 or by programming the robot 10 to locate the upper element 54 to the lower element 52. In either case, the two elements are mounted to the lower base fixture member 20 to establish a net location relative to each other before the upper fixture member 30 and its associated clamping arrangement is moved into position with the lower base fixture member 20. Upon mating and locking the upper fixture member 30 to the lower base fixture member 20 the end effector fixture assembly 5 or geometry station 1 is established having the subassembly workpiece 50 accurately positioned within the end effector assembly fixture 5. Once the net location of the lower and upper elements 52 and 54 has been established and the upper fixture member 30 has been secured to the lower base fixture member 20 with the subassembled workpiece 50 secured in place, the geometry station 1 can be manipulated by the robot 10 by lifting the whole end effector assembly 5 (upper and lower fixture clamped together) from the stationary support stands 60, 62 and 64 to present the end effector assembly 5 to a work performing device 80 located within the surrounding area of the robot 10. Depending on the nature of the work to be performed on the lower and upper elements 52 and 54 located within the end effector fixture 5, the robot 10 may be programmed to present the end effector fixture assembly 5 to a remote work station welder 81 which welds the parts together such as that shown in FIG. 1 or thereafter to a work station that punches holes in the subassembly workpiece 50 or any number of work performing stations that are located within the surrounding confines of the robot 10.

It is herein contemplated that a plurality of geometry stations may be placed in a consecutive arrangement to establish a production line for assembling a plurality of elements to each other in consecutive geometry stations, each of which is programmed according to the disclosure of the invention and the output of such production line arrangement being a complete automotive body assembly.

The robot end effector upper fixture member 30 further incorporates a clamping and securing arrangement for the subassembly workpiece mounted within the workpiece locators 21 and 22.

Referring to FIGS. 1 and 5, for purposes of illustrating the invention, the boundary frame 32 has attached thereto the clamping and securing arrangement in the form of a clamping post 92 and clamping rods 90 and 93 which, upon interlocking the upper fixture member 30 of the end effector fixture to the lower base fixture member 20, applies a downward clamping pressure upon the subassembly workpiece upper element 54. Also attached to the upper fixture member 30 of the end effector fixture are suction cups 94 for purposes to be described below.

OPERATION

In operation the lower base fixture member 20, in its "at rest" mode, rests upon the stationary support stands 60, 62 and 64 located within the surrounding floor space of the robot 10, or the base plate 70 shown in FIG. 1, or any other suitable means of support. While in the "at rest" mode, the individual lower and upper elements 52 and 54 of the subassembly workpiece 50 are loaded and accurately positioned upon the lower base fixture member 20 by means of the workpiece locators 21 and 22 to establish a net locating position with respect to each other. The subassembly lower and upper elements 52 and 54 may be manually positioned or could be positioned by means of the robot 10 as described above.

Once the subassembly lower and upper elements 52 and 54 are accurately positioned with respect to the lower base fixture member 20, the robot 10, having the upper fixture member 30 of the composite end effector fixture assembly 5 attached to the robot wrist head 12, accurately locates the upper fixture member 30 upon the lower base fixture member 20. Upon mating of the upper fixture member 30 to the lower base fixture member 20, the upper fixture member 30 is guided into place by reception of the guide and alignment pins 34 into the alignment pin holes 27 in the attachment blocks 23 and 24 on the lower base fixture member 20, and the two fixtures are coupled together by any suitable locking technique, such as the toggle latch 40 shown in FIG. 6, to establish an end effector fixture assembly 5.

By means of the toggle latch 40, the latch pin 48 engages the notch 36 of the guide and alignment pin 34. The torque link 42 is rotated the torque link pivot 44 from an unlatched position A to a latched position B, thereby interlocking the upper fixture member 30 rigidly to the lower base fixture member 20, creating a geometry station 1 about the subassembly workpiece 50.

Figure 2:
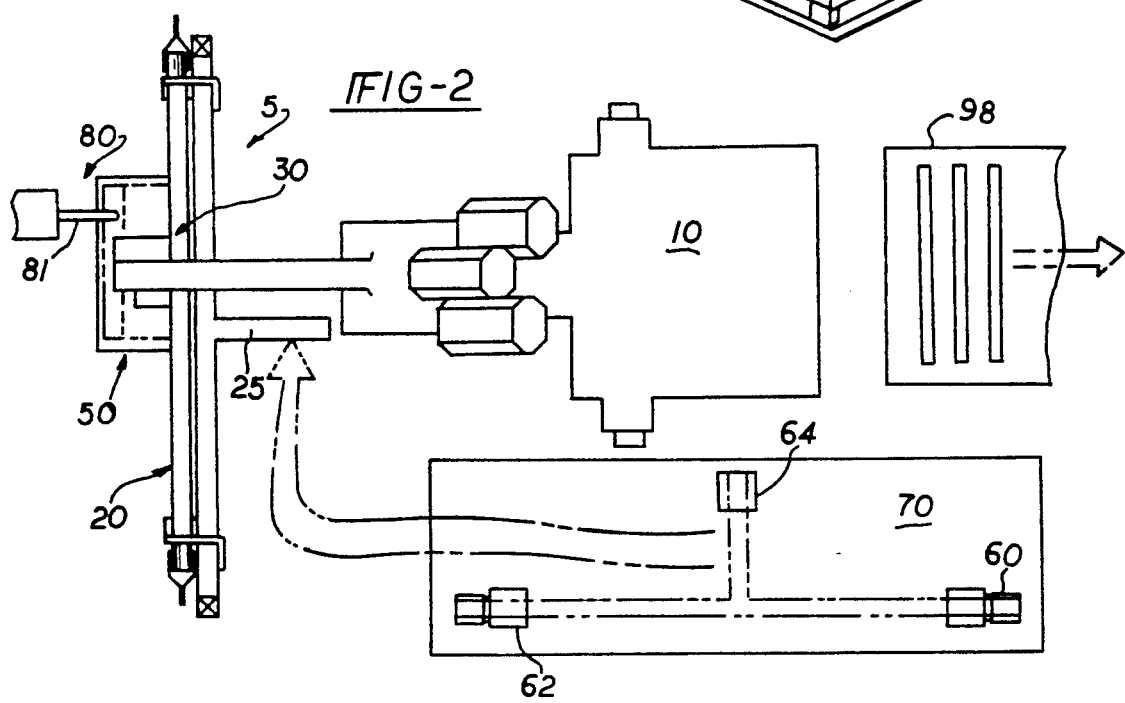
FIG. 2 is a plan view of the work envelope of a computer controlled robot embodying the present invention if work is performed only by one work performing device.

As the upper fixture member 30 is lowered onto the lower base fixture member 20 and interlocked therewith, the clamping post 92 and clamping rods 90 and 93 engage the top surface of the subassembly upper element 54 thereby applying a clamping force upon the positioned subassembly workpiece 50 and accurately restraining the subassembly workpiece 50 in a pre-established relative location within the geometry station 1. The geometry station, having the subassembly workpiece accurately positioned thereon may now be transported to one or more remote work performing stations within the surrounding area of the robot for the performance of work on the subassembly workpiece such as welding at the remote work station welder 81 as depicted in FIG. 2.

After all desired work is performed upon the subassembly workpiece 50 in each of the various work stations surrounding the robot 10, the robot 10 returns the end effector fixture assembly 5 or geometry station 1 with the completed subassembly workpiece 50 restrained thereon and repositions the geometry station 1 upon the stationary support stands 60, 62 and 64 using the guide pins 26 to position and locate the lower base fixture member 20 thereupon. After the geometry station 1 is positioned upon the stationary support stands 60, 62 and 64, the toggle latch 40 is unlocked, releasing the upper fixture member 30 from the lower base fixture member 20. The suction cups 94 are now energized thereby securely holding the complete subassembly workpiece 50 against the upper fixture member clamping post 92 and clamping rods 90 and 93.

The robot 10 now may lift the upper fixture member 30, with the subassembly workpiece 50 attached thereto, leaving the lower base fixture member 20 in its "at rest" position atop the stationary support stands 60, 62 and 64. The robot 10 now transports the upper fixture member 30 with the completed subassembly workpiece 50 attached, to any desired transfer station, such as an exit conveyor 98 as shown in FIG. 2, and deposits the completed subassembly workpiece 50 thereupon by the release of the suction cups 94.

Upon depositing the completed workpiece 50 on the exit conveyor 98 the robot 10 may be programmed to return the upper fixture member 30 to the lower base fixture member 20 while an operator manually loads both lower and upper elements 52 and 54 in position on the lower base fixture member 20 or, in the alternative, the robot 10 may be programmed to a feeder conveyor (not shown) in the surrounding vicinity of the robot to pick up an upper element 54 and position the upper elements 54 to the lower element 52 which has been manually located on the lower base fixture member 20 whereafter the process with a newly loaded base fixture member 20 is repeated.

The foregoing disclosure is the best mode devised by the inventor for practicing the invention at this time. It is apparent, however, that modifications and variations to the instant invention will be obvious to those skilled in the art. Inasmuch as the foregoing disclosure is intended to enable one skilled in the pertinent art to practice the instant invention, it should not be construed to be limited thereby but is to be construed to include obvious variations and be limited only by the spirit and scope of the following claims.

What is claimed is:

1. A method of manipulating at least two objects and performing work on said at least two objects while said at least two objects are mounted in a unitary frame structure, said method comprising the steps of:
   providing a support structure;
   positioning a first frame structure, having a first locating means thereon on said support structure;
   positioning said at least two objects on said first locating means of said first frame structure, thereby establishing a net location between said at least two objects;
   positioning a second frame structure, having a second locating means thereon on said first frame structure, thereby retaining said at least two objects at said net location atop said support structure;
   interengaging said first frame structure with said second frame structure, thereby establishing a unitary frame structure having said at least two objects accurately located therein and maintained at said net location atop said support structure;
   while maintaining said at least two objects at said net location within said unitary frame structure, lifting and transporting said unitary frame structure from said support structure to a work performing device located within a defined work region surrounding said support structure, and using said work performing device to perform work on said at least two objects; and
   while maintaining said at least two objects at said net location within said unitary frame structure, returning said unitary frame structure to said support structure after work has been performed on said at least two objects by said work performing device.

2. The method as claimed in claim 1 further comprising, after returning said unitary frame structure to said support structure, the steps of:
   securing said at least two objects in said second frame structure;
   disengaging said first frame structure from said second frame structure; and
   transporting said second frame structure with said at least two objects secured therein to a remote discharge station located within said defined work region surrounding said support structure and unloading, from said second frame structure at said remote discharge station, said at least two objects upon which work has been performed by said work performing device.

* * * * *

UNITED STATES PATENT AND TRADEMARK OFFICE
CERTIFICATE OF CORRECTION

PATENT NO. : 5,265,317
DATED : November 30, 1993
INVENTOR(S) : Jeffrey R. Angel

It is certified that error appears in the above-indentified patent and that said Letters Patent is hereby corrected as shown below:

Column 5, line 43, after "Toggle" insert ---- links ----.

Column 5, line 45, after "42" insert ---- as ----.

Column 5, line 59, delete "device" insert ---- devices ----.

Column 6, line 13, after "the" insert ---- composite ----.

Column 7, line 22, after "rotated" insert ---- about ----.

Column 8, line 9, after "loaded" insert ---- lower ----.

Signed and Sealed this

Twenty-first Day of June, 1994

Attest:

BRUCE LEHMAN

Attesting Officer   Commissioner of Patents and Trademarks